United States Patent [19]
Koehler

[11] 3,714,842
[45] Feb. 6, 1973

[54] PIVOT MOUNTING FOR TRIP BAR OF HAND BRAKE MECHANISM

[75] Inventor: William F. Koehler, Chicago, Ill.

[73] Assignee: Cleveland Hardware & Forging Company, Cleveland, Ohio

[22] Filed: June 23, 1971

[21] Appl. No.: 155,915

[52] U.S. Cl. ................................................. 74/505
[51] Int. Cl. ............................................. G05g 1/08
[58] Field of Search ............... 74/505, 506, 507, 508

[56] References Cited

UNITED STATES PATENTS

| | | | |
|---|---|---|---|
| 3,040,597 | 6/1962 | Bretz, Jr. | 74/505 |
| 3,258,991 | 7/1966 | Bezlaj | 74/505 |

*Primary Examiner*—Milton Kaufman
*Attorney*—Robert R. Lockwood

[57] ABSTRACT

The trip bar of a hand brake mechanism comprises a tie bar having a lever at each end for releasing the driving connection between a ratchet wheel and a gear wheel rotatable with a chain winding drum, each lever having a pivot aperture for receiving a pivot pin extending inwardly from the side wall of the brake mechanism housing. Each pivot pin has an annular groove for receiving a U-shaped slot in a plate like pin keeper juxtaposed to the respective side wall of the housing to hold the pivot pin in operative position. A cylindrical spring guide is secured to each pin keeper to receive a coil compression spring arranged to bias the respective lever to maintain the driving connection.

2 Claims, 8 Drawing Figures

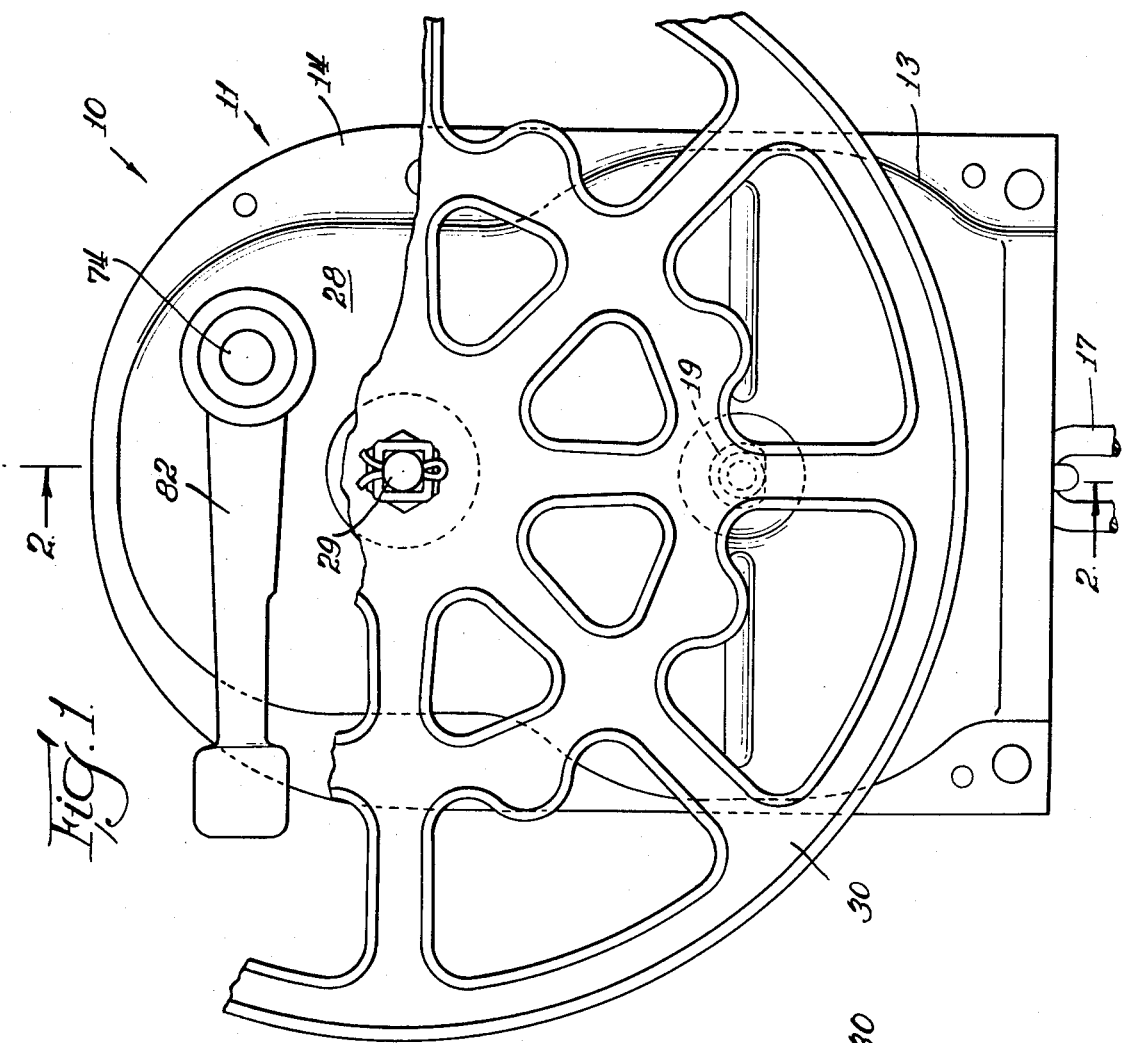
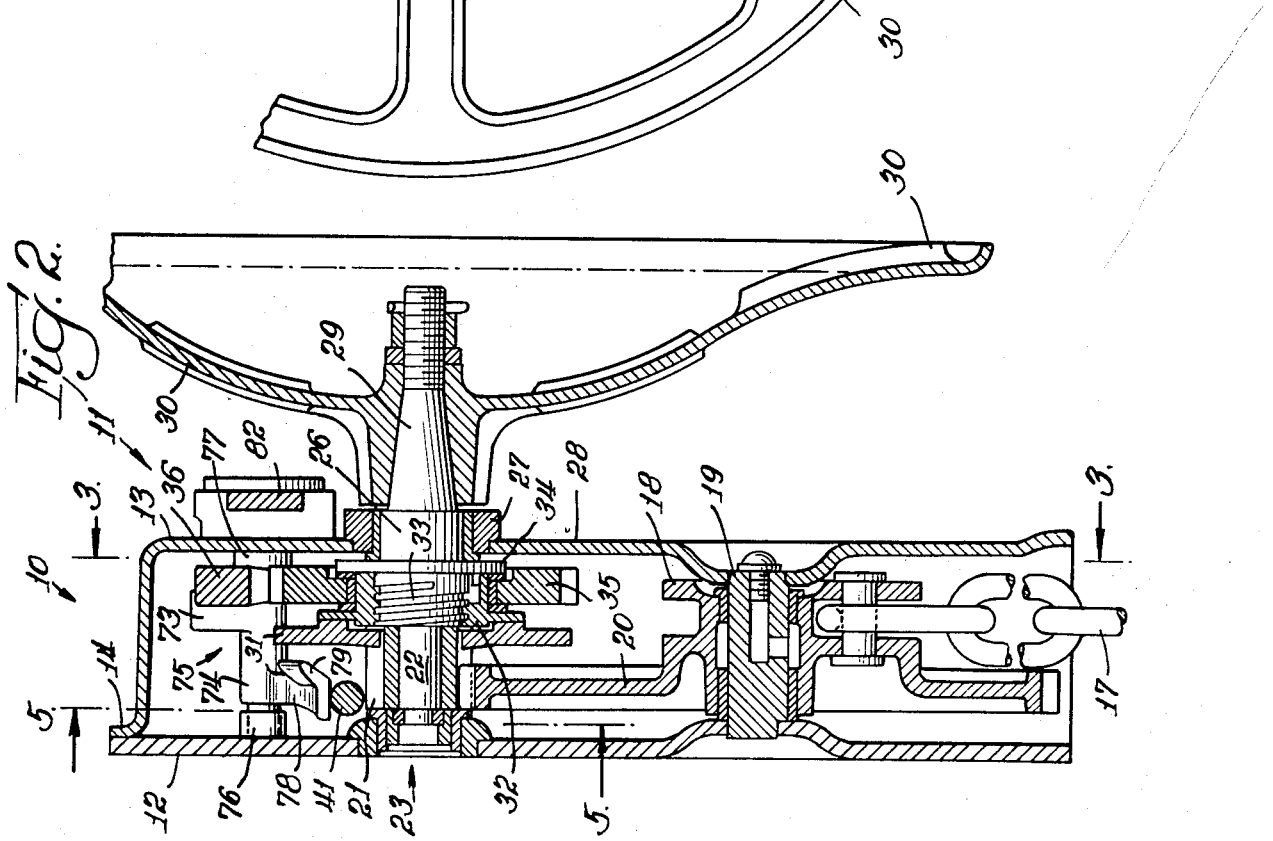

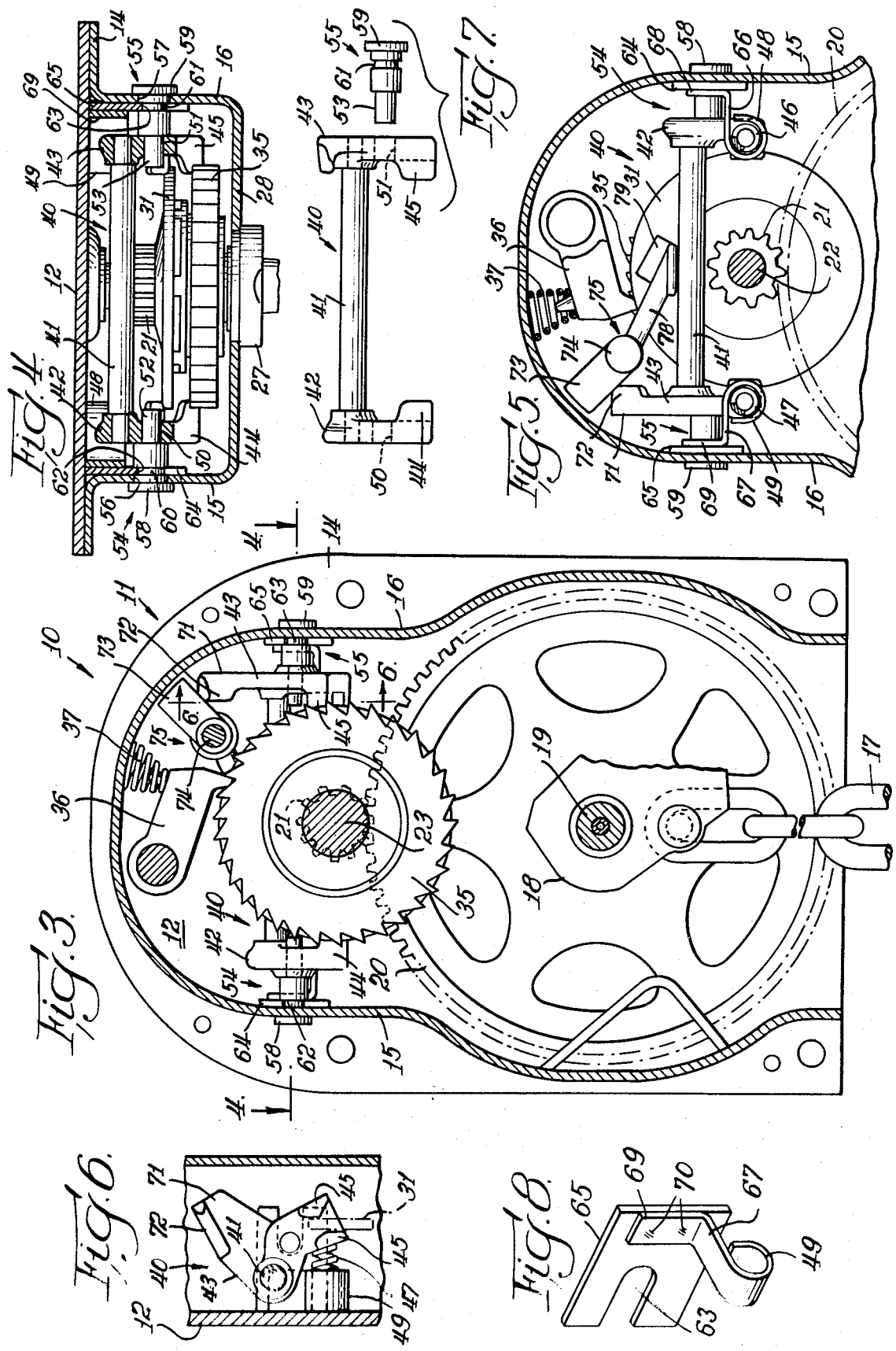

3,714,842

PIVOT MOUNTING FOR TRIP BAR OF HAND BRAKE MECHANISM

This invention relates, generally, to hand brake mechanisms for railway cars and it constitutes an improvement over the hand brake construction disclosed in Bretz, Jr. U.S. Pat. No. 3,040,597, issued June 26, 1962.

The hand brake mechanism of the above Bretz, Jr. patent employs a trip bar construction for releasing the driving connection between the ratchet wheel and the gear wheel that is rotatable with the chain winding drum which, while mechanically satisfactory, is relatively expensive and complicated to manufacture and install. It comprises levers at the ends of a tie bar which are arranged to shift a flange rotatable with a driving pinion for the gear wheel out of and into driving engagement with the ratchet wheel. The levers of the patent are provided with outstanding trunnions that are journaled in bearings mounted on the inside of the brake mechanism housing.

Among the objects of this invention are: To provide an improved pivot mounting for the trip bar construction of a hand brake mechanism that is simple and efficient in operation and can be readily and economically manufactured and installed; to provide aligned apertures in the levers at the ends of the tie bar for receiving pivot pins inserted through the side walls of the brake mechanism housing; to employ a plate like pin keeper having a U-shaped slot for entering an annular groove in each pin inside of each side wall of the housing for holding the pin in position; and to mount on each keeper a guide for a spring arranged to bias the flange to maintain the driving connection with the ratchet wheel.

In the drawings:

FIG. 1 is a view, in front elevation, of a hand brake mechanism in which this invention is embodied, the upper portion of the hand wheel being broken away in order to show more clearly the trip lever mounted behind it.

FIG. 2 is a vertical sectional view taken generally along line 2—2 of FIG. 1.

FIG. 3 is a vertical sectional view taken generally along line 3—3 of FIG. 2.

FIG. 4 is a horizontal sectional view taken generally along line 4—4 of FIG. 3.

FIG. 5 is a vertical sectional view taken generally along line 5—5 of FIG. 2.

FIG. 6 is a vertical sectional view taken generally along line 6—6 of FIG. 3.

FIG. 7 is a plan view of the trip bar means having associated therewith one of the pivot pins on which it is pivotally mounted. FIG. 8 is a perspective view of one of the plate like pin keepers with the spring guide mounted thereon.

In FIGS. 1, 2 and 3 the reference character 10 designates, generally, a hand brake mechanism of the kind and character disclosed in the above patent but modified in accordance with this invention. The hand brake mechanism 10 includes a metallic case, indicated generally at 11, which is made up of a back plate 12 for suitable mounting on a railroad car and a cover 13 which is provided with an outstanding flange 14 overlying the outer edge portions of the back plate 12 and suitably secured thereto. The cover 13 is provided with generally vertical side walls 15 and 16.

For applying and releasing the brakes there is provided a chain 17 that is connected in conventional manner to the brake rigging. For applying the brakes the chain 17 is wound on a chain winding drum 18 that is journaled on a shaft 19. Integral with the drum 18 is a main gear wheel 20 which is arranged to be driven by a pinion 21 which is freely rotatably mounted on a reduced diameter section 22 of a hand wheel shaft that is indicated, generally, at 23. At its rear end the hand wheel shaft 23 is suitably journaled on the back plate 12. It has a bearing portion 26 near its front end which is journaled in a bushing 27 that is mounted on the front wall 28 of the cover 13. Also it will be observed that the shaft 19 is mounted at its ends on the back plate 12 and the front wall 28. At the outer end of the hand wheel shaft 23 there is a hand wheel receiving section 29 on which a hand wheel 30 is non-rotatably mounted.

In order to provide a driving connection between the hand wheel 30 and the pinion 21, the latter has slidably mounted thereon a radially extending flange 31. As described in the patent above referred to provision is made for mechanically interconnecting the radially extending flange 31 and a pressure nut 32 which is mounted on a threaded section 33 of the hand wheel shaft 23. A brake flange 34 is integral with the hand wheel shaft 23 and located between it and the pressure nut 32 is a ratchet wheel 35. The ratchet wheel 35 is prevented from reverse rotation by a pawl 36, FIGS. 3 and 5, which is biased into operative engagement with the ratchet wheel 35 by a spring 37.

For applying the brakes, the hand wheel 30 is rotated in a clockwise direction as viewed in FIG. 1. Since some tension is applied to the chain 17 there will be some resistance to rotation by the pinion 21 and the pressure nut 32. The rotation of the hand wheel 30 and hand wheel shaft 23 against this tension causes the pressure nut 32 to rotate slightly along the threaded section 33. As a result the ratchet wheel 35 is clamped between the pressure nut 32 and the brake flange 34. As long as the flange 31 maintains its mechanical connection to the pressure nut 32, the driving connection to the pinion 21 is maintained. Reverse rotation is prevented by the pawl 36.

It may be desirable to quickly release the brakes by shifting the radially extending flange 31 out of mechanical engagement with the pressure nut 32 for interrupting the driving connection between the hand wheel shaft 23 and the pinion 21. This is accomplished through the provision of trip bar means indicated, generally at 40. In FIGS. 3-7 of the drawings the trip bar means 40 comprises a tie bar 41 to the ends of which levers 42 and 43 are secured. Jaws 44 and 45 at distal ends of the levers 42 and 43 are arranged, as shown in FIG. 6, to engage opposite sides of the radially extending flange 31 for shifting it into and out of engagement with the pressure nut 32 for controlling the driving engagement between the hand wheel shaft 23 and the pinion 21. Coil compression springs 46 and 47 interposed between the back plate 12 and the jaws 44 and 45 are effective to bias the radially extending flange 31 into driving engagement with the pressure nut 32. The springs 46 and 47 are guided by cylindrical spring guides 48 and 49, FIG. 5, which are supported in a manner to be described.

In accordance with this invention the levers 42 and 43 are provided with aligned pivot apertures 50 and 51 which are arranged to receive reduced diameter ends 52 and 53 of pivot pins that are indicated, generally, at 54 and 55. One of them is shown in more complete detail in FIG. 7. The pivot pins 54 and 55 extend through apertures 56 and 57 which are provided in the side walls 15 and 16 of the cover 13 as shown in FIG. 4. Head portions 58 and 59, formed integrally with the pivot pins 54 and 55 limit the inward movement of the pivot pins 54 and 55 as will be understood readily.

The pivot pins 54 and 55 are held in position with respect to the side walls 15 and 16 by the provision therein of annular grooves 60 and 61 which are arranged to receive U-shaped slots 62 and 63 that are formed in plate like pin keepers 64 and 65. One of the keepers 64 is shown in more detail in FIG. 8. They are of duplicate construction except one is of opposite hand construction insofar as the mounting of the spring guides 48 and 49 is concerned. For this purpose L-shaped brackets 66 and 67 are employed with the cylindrical spring guides 48 and 49 formed integrally therewith. Foot portions 68 and 69 of the brackets 66 and 67 overlie the plate like pin keepers 64 and 65 and, as shown in FIG. 8, they are secured thereto by suitable means such as spot welding as indicated at 70.

The assembly of the trip bar means 40 within the cover 13 is readily accomplished. After the tie bar 41 with the levers 42 and 43 secured thereto is positioned in place, the pivot pins 54 and 55 are inserted with the reduced diameter inner ends 52 and 53 extending through the pivot apertures 50 and 51. Then the plate like pin keepers 64 and 65 are inserted with the U-shaped slots 62 and 63 embracing the annular grooves 60 and 61.

For manually shifting the trip bar means 40 to displace the radially extending flange 31 from driving engagement with the pressure nut 32 the lever 43 is provided with a lever arm 71, FIGS. 3, 5 and 6 having near its distal end a lateral flange 72. The flange 72 is arranged to be engaged by a cam arm 73 that extends radially from a cam shaft 74 which forms a part of trip cam means indicated, generally, at 75. The rear end of the cam shaft 74 is journaled in a bearing 76, FIG. 2, that is secured to the front side of the back plate 12. The other end of the cam shaft 74 is journaled in a bearing 77 that is carried by the front wall 28 of the cover 13. A safety arm 78 extends radially from the cam shaft 74 and is provided with a flared end 79 for the purpose of preventing inadvertent disengagement of the radially extending flange 31 from driving engagement with the pressure nut 32.

The forward end of the cam shaft 74 extends through the front wall 28 of the cover 13 where a manually operable trip lever 82, FIGS. 1 and 2, is mounted thereon. Normally the trip lever 82 occupies the position shown in FIG. 1. It has a lost motion connection to the cam shaft 74. On pivotal movement of the trip lever 82 in a clockwise direction, as viewed in FIG. 1, the trip cam means 75 is pivoted in a corresponding manner to move the flared end 79 out of the path of the radially extending flange 31 while the cam arm 73 engages the lateral flange 72 on the lever arm 71 and pivots the trip bar means 40 about the pivot pins 54 and 55. Through the jaws 44 and 45 the radially extending flange 31 is moved laterally of the pinion 21 and out of mechanical engagement with the pressure nut 32. While the pawl 36 continues to prevent reverse rotation of the ratchet wheel 35, the chain 17 is permitted to unwind rapidly from the chain winding drum 18 to effect release immediately of the brakes fully and completely.

I claim:

1. In a hand brake mechanism, the combination with a housing, chain winding drum and a main gear wheel rotatably mounted on said housing, a hand wheel shaft rotatably mounted on said housing having a bearing section at one end and a hand wheel receiving section at the other end externally of said housing, a ratchet wheel intermediate the ends of said shaft and rotatable therewith, a pawl in said housing cooperating with said ratchet wheel to hold it against reverse rotation, a pinion freely rotatable on said bearing section of said shaft and engaging said main gear wheel and having a radially extending flange rotatable conjointly therewith, a disengageable driving connection between said flange and said ratchet wheel, and a trip cam rotatably mounted in said housing of: trip bar means operable by said trip cam for cooperating with said flange for moving it to disengage said driving connection and permit said pinion to rotate freely to release said main gear wheel for rotation in a brake releasing direction, and pivot pin means extending inwardly of said housing and pivotally supporting said trip bar means, said trip bar means comprising a pair of levers interconnected by a trip bar and having pivot apertures in alignment intermediate their ends, said pivot pin means including a pair of pivot pins extending into said pivot apertures, each of said pivot pins having an annular groove spaced outwardly of the respective lever, and a plate like pin keeper having a U-shaped slot embracing each pivot pin in its annular groove and juxtaposed to the inside of said housing for holding each pivot pin in operative position.

2. The invention according to claim 1 wherein a cylindrical spring guide is secured to each pin keeper, and a coil compression spring in each spring guide reacts against said housing to bias the respective lever and thereby said flange to maintain said driving connection between said flange and said ratchet wheel.

* * * * *